United States Patent
Schwital et al.

(12)
(10) Patent No.: US 6,742,413 B2
(45) Date of Patent: Jun. 1, 2004

(54) DRIVE DEVICE FOR A SUNROOF OF A MOTOR VEHICLE

(75) Inventors: Ralf Schwital, Germering (DE); Bernhard Meier, Kirchheim (DE); Thomas Kraus, Gauting (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 6 days.

(21) Appl. No.: 10/153,871

(22) Filed: May 24, 2002

(65) Prior Publication Data

US 2003/0015059 A1 Jan. 23, 2003

(30) Foreign Application Priority Data

May 25, 2001 (DE) .......................... 101 25 582

(51) Int. Cl.[7] .......................... F16H 29/20; F16H 1/20; H02K 5/00
(52) U.S. Cl. ...................... 74/606 R; 310/89; 74/89.14; 74/425
(58) Field of Search ............... 74/606 R, 425, 74/89.14; 310/75 R, 68 B, 68 C, 89

(56) References Cited

U.S. PATENT DOCUMENTS

| 4,436,338 A | * | 3/1984 | Jardin ........................ 296/223 |
| 4,659,140 A | * | 4/1987 | Fuerst et al. ................. 296/223 |
| 4,659,141 A | * | 4/1987 | Masuda et al. .............. 296/223 |
| 5,172,605 A | * | 12/1992 | Schwartz ................... 74/421 A |
| 5,705,755 A | * | 1/1998 | Yamamura ............. 73/862.191 |
| 5,768,942 A | | 6/1998 | Gruber et al. |
| 6,003,397 A | * | 12/1999 | Yasuhira ....................... 74/425 |
| 6,162,142 A | | 12/2000 | Hori et al. |
| 6,404,084 B1 | * | 6/2002 | Niki et al. ................. 310/75 R |
| 2003/0008746 A1 | * | 1/2003 | Meier et al. ................. 475/149 |

FOREIGN PATENT DOCUMENTS

| DE | 19849837 A1 | * | 5/2000 | ............... 74/606 R |
| DE | 10123422 A1 | * | 5/2001 | ................... 74/506 |

OTHER PUBLICATIONS

Table 1–110 Properties of Common Solid Materials, p. 177, CRC Handbook of tables for Applied Engineering Science, 2nd Edition, CRC Press, 1976.*

* cited by examiner

Primary Examiner—Vinh T. Luong
(74) Attorney, Agent, or Firm—Nixon Peabody LLP; David S. Safran

(57) ABSTRACT

In a drive device, especially for a sliding roof of a motor vehicle, with an electric motor (10), gearing (24) which is driven by the electric motor, and a circuit (22) for triggering the electric motor, the gearing (24) is accommodated in a gear casing (42) with at least one casing wall (50) of high thermal conductivity and at least part of the circuit (22) is located adjacent to this casing wall (50) outside of the gear casing (42). Furthermore, contact (36) is made between the components (44) of the circuit (22) and the casing wall (50) in order to dissipate the heat which forms during operation of the circuit (22) to the casing wall (50).

18 Claims, 5 Drawing Sheets

DRIVE DEVICE FOR A SUNROOF OF A MOTOR VEHICLE

BACKGROUND OF THE INVENTION

1. Field of the Invention

The invention relates to a drive device, especially for displacement of the sliding roof of a motor vehicle, with an electric motor, gearing driven by the electric motor, and a circuit for triggering the electric motor.

2. Description of Related Art

A drive device of the initially mentioned type is described in U.S. Pat. No. 6,162,142. Here, in particular, a drive device for a motor vehicle roof is proposed in which rotation of the driven shaft of the electric motor is tapped by means of a worm gear pair which is held in contact with the driven shaft by means of a housing which surrounds both the driven shaft and the worm gear pair. Furthermore, the housing has a housing area which is laterally offset next to the worm gear pair and in which there is a board on which there are components for triggering the drive motor. The individual assemblies, especially the driven shaft and the worm gear pair which is driven by the driven shaft are not shielded relative to the board so that there is the danger that ordinarily lubricant which is provided between the driven shaft and the worm gear pair can leak onto the board and the components located on it; this can lead to an adverse effect on the function of these components.

Additionally, U.S. Pat. No. 5,768,942 discloses a drive for a motor vehicle roof in which the reducing gear and electrical circuit are accommodated in separate housing parts which are detachably joined to one another to enable flexible matching to different circuit layouts. The gear housing part is produced as a metal die casting and the electric housing part as an injection molded plastic part.

SUMMARY OF THE INVENTION

A primary object of this invention is to devise a drive device of the initially mentioned type which has a compact structure and in which reliable operation of the device is ensured even over long and intense periods of use.

This object is achieved in a drive device of the initially mentioned type in that the gearing is accommodated in a gear casing with at least one casing wall of high thermal conductivity and at least part of the circuit is located adjacent to this casing wall outside the gear casing. Furthermore, contact between the components of the circuit and the casing wall acts to dissipate the heat which forms during operation of the circuit to the casing wall.

In this way, an inherently closed drive device with an electric motor, gearing driven by the electric motor and a circuit for triggering the electric motor is made available, in which these assemblies can be located extremely compactly, especially in a common housing, but the gearing being accommodated in a separate gear casing so that the lubricant which is ordinarily used in these casings cannot reach the circuit and thus adversely affect operation of the electronic circuit for triggering the electric motor. Furthermore, the use of the casing wall of the gear casing as a cooling surface for components of the circuit makes it possible not only to build the drive device smaller overall, and thus more compact, since additional cooling volume need not be made available, but makes it possible to accommodate the drive device in plastic housings which are lighter and easier to produce compared to the metal die cast housings used in the past, and which to date due to their thermal conductivity which is low compared to metal housings were problematical with respect to overheating of the circuit components located in them.

Other embodiment and features are described in detail below. For example, contact of the circuit or of its components with the casing wall can be made using any means which are good conductors of heat, but which are at the same time electrical insulators. Examples of these contact-making means are cooling lugs assigned to the circuit, as well as thermally conductive foils which are located between the circuit and the casing wall, whether in the form of a filler or as individual lugs which are applied to the individual components to be cooled, for example cemented, or thermally conductive foam or fiber bodies located between the circuit and the casing wall, for example, made of thermally conductive, electrically insulating material or in the form of a composite which is composed of a thermally conductive, electrically conductive fiber material, for example, aluminum fibers, and an insulator layer which is applied to one side or both sides.

Preferably, the circuit is accommodated in an electronics housing which is at the same time part of the gear casing. Here, the electronics housing can have a lower part which is, at the same time, part of the gear casing, and a cover. Furthermore, the gear casing can be formed by a wall surface of the electronics housing, a side wall connected integrally to the wall surface, and a cover which is seated on the side wall and which preferably seals the gear casing closed. To keep the weight of the drive device as low as possible, the electronics housing and the gear casing which is preferably at least partially integrated with it can be produced from plastic, to make available a cooling surface for components of the circuit for triggering the electric motor, the cover being made of a metallic material with which the components to be cooled are in contact.

In another embodiment of the invention, the electric motor can have a pole shaft which is located in the shaft housing and which is drive-connected to the gearing. In the same manner in which the electronics housing and the gear casing are preferably at least partially integrated, feasibly the shaft housing is also at least partially integrated into the electronics housing.

An especially compact and still easily accessible drive device arises when the electronics housing has a lower part into which both the gear casing and the shaft housing are integrated, the gear casing and the shaft housing being formed by a wall surface of the electronics housing, a side wall which is connected in one piece to this wall surface, and a preferably common cover which is seated on the side wall, and the electronics housing, furthermore, having a cover which can be placed on the lower part and which preferably has means for locking the circuit.

The (partial) integration of the gear casing and the shaft housing into the electronics housing yields an extremely compact drive device in which the mutual integration of the individual housing sections saves not only material, and thus weight, but at the same time, also increases the stability of the entire device, especially when the lower part and the cover of the electronics housing are each one-piece shaped components in which, then, the subdividing walls, i.e., the side wall of the gear casing and the side wall of the shaft housing, are used at the same time as reinforcements of the entire arrangement.

One preferred embodiment of the drive device proposed here is detailed below with reference to the attached drawings.

DETAILED DESCRIPTION OF THE INVENTION

Figure 1:
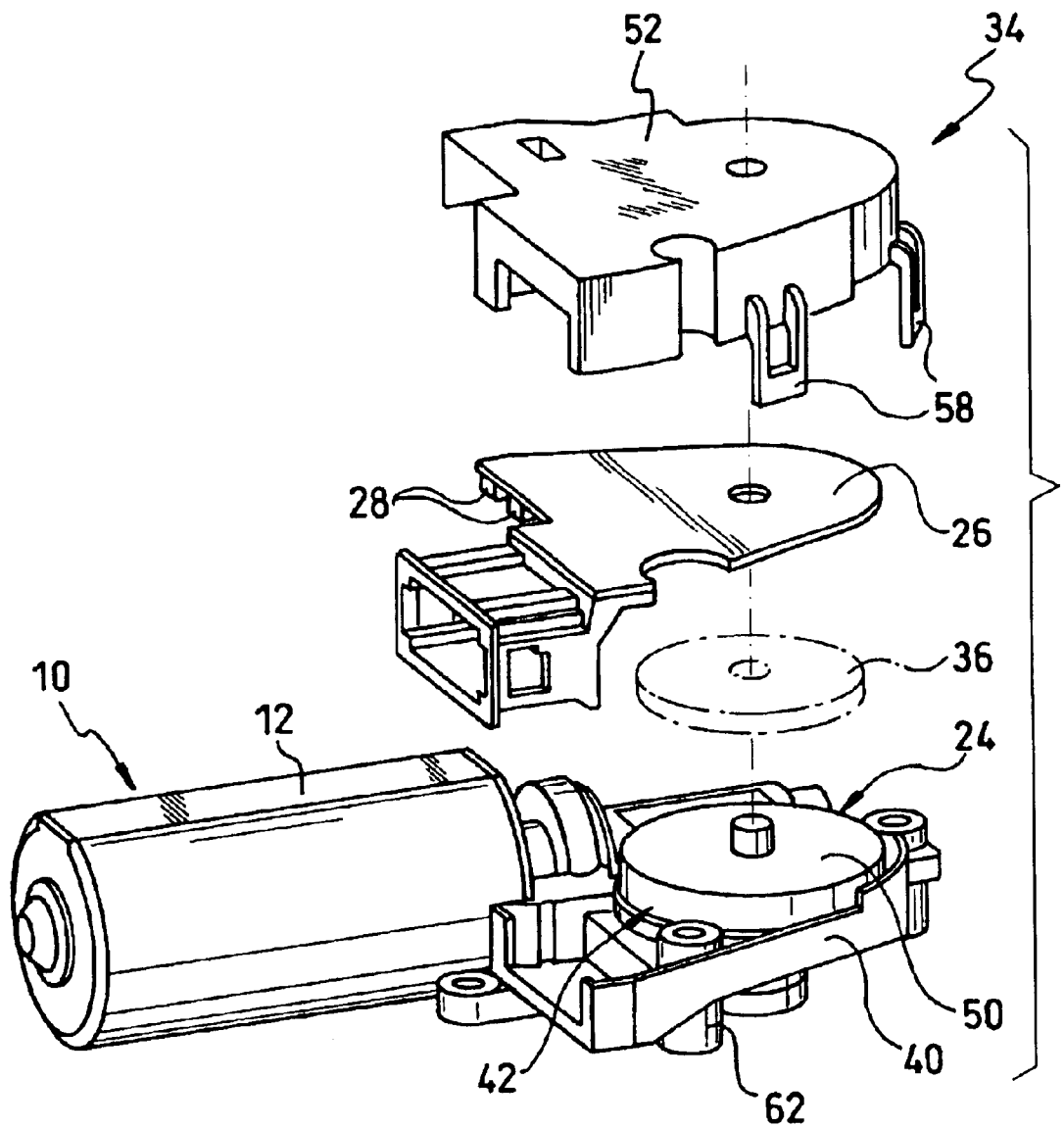
FIGS. 1 & 5, each show a schematic, exploded perspective of a drive device in accordance with a respective embodiment of the invention seen obliquely from above.

The drive device shown in FIGS. 1 to 4 has an electric motor 10 which has an armature 14 (see FIG. 4) surrounded by a pole cup 12 (see FIG. 1), a motor shaft or pole shaft 16 and a brush system 18 which is provided via motor contacts 20 with an electronic circuit 22 for triggering the motor. The front area of motor shaft 16 bears a worm shaft which engages a worm wheel 24. The concept "bears" here is intended to encompass both a worm shaft which is formed as a separate component and also a worm shaft 68 which is made in one piece with the motor shaft 16. The step-down gearing formed in this way is used to drive a movable component, especially the cover element of an openable motor vehicle roof, for example, the cover of a sliding roof or lifting and sliding roof or the louver of a louvered roof.

Figure 2:
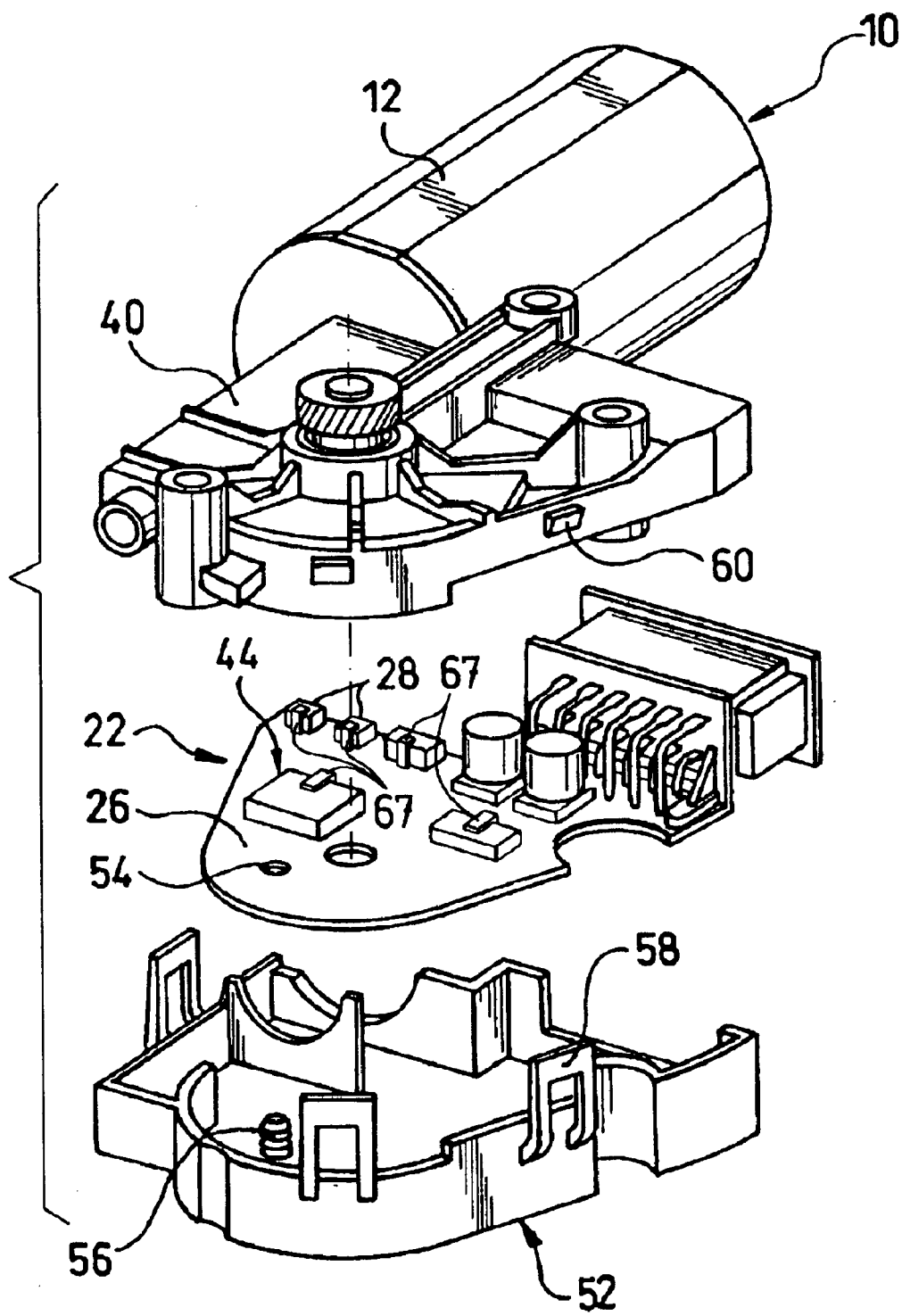
FIG. 2 shows a schematic, exploded perspective of a drive device in accordance with the invention of FIG. 1 seen obliquely from below.

The trigger electronics 22 for the motor 10 is accommodated on a circuit board or a board 26 which, as shown in FIGS. 1 & 2, extends over the worm wheel. Furthermore, on the board 26, there are preferably two Hall sensors 28 to detect the rotary position of the magnet, and thus of the pole shaft 16, by detecting the magnetic field emanating from the magnet wheel 30 which is located on the pole shaft 16. To keep the installation space of the electronic circuit for triggering the motor 10 as small as possible, the board 26 is preferably equipped on both sides with components 44, especially SMD components. As follows especially from FIGS. 3 & 4, the pole shaft 16 is located within the shaft housing 32 in the completely mounted state of the drive device; its side that faces upward in FIG. 3 being, at the same time, the bottom of the electronics housing 34 which holds the electronics 22, and which is preferably made of plastic. As follows especially from FIG. 3, the pole shaft 16 is surrounded by the shaft housing 32 such that there is no connecting opening between the shaft housing 32 and the electronics housing 34 through which, for example, a lubricant of the pole shaft 16 can pass through toward the board 26.

With reference to FIGS. 1 & 2, again, the electronics housing 34, and especially the lower part 40 which is connected to the motor 10, at the same time, forms the lower part of the gear casing 42 in which the worm wheel 24 which engages the pole shaft 16 is housed. For this purpose, the electronics housing 34 has a wall 46 (FIG. 3) which surrounds the worm wheel 24 in the lower part of the gear casing formed by the bottom of the electronics housing 34, the wall 46 and part of the side wall 48 of the electronics housing 34 being closed by means of a cover 50 relative to the remaining interior space of the electronics housing 34. The cover 50 is made of a material with high thermal conductivity, especially a metallic material and is used as a cooling surface for the circuit components which are located in the completely mounted state of the drive device in the immediate vicinity of the cover 50 and which sit on the board 26.

Figure 5:
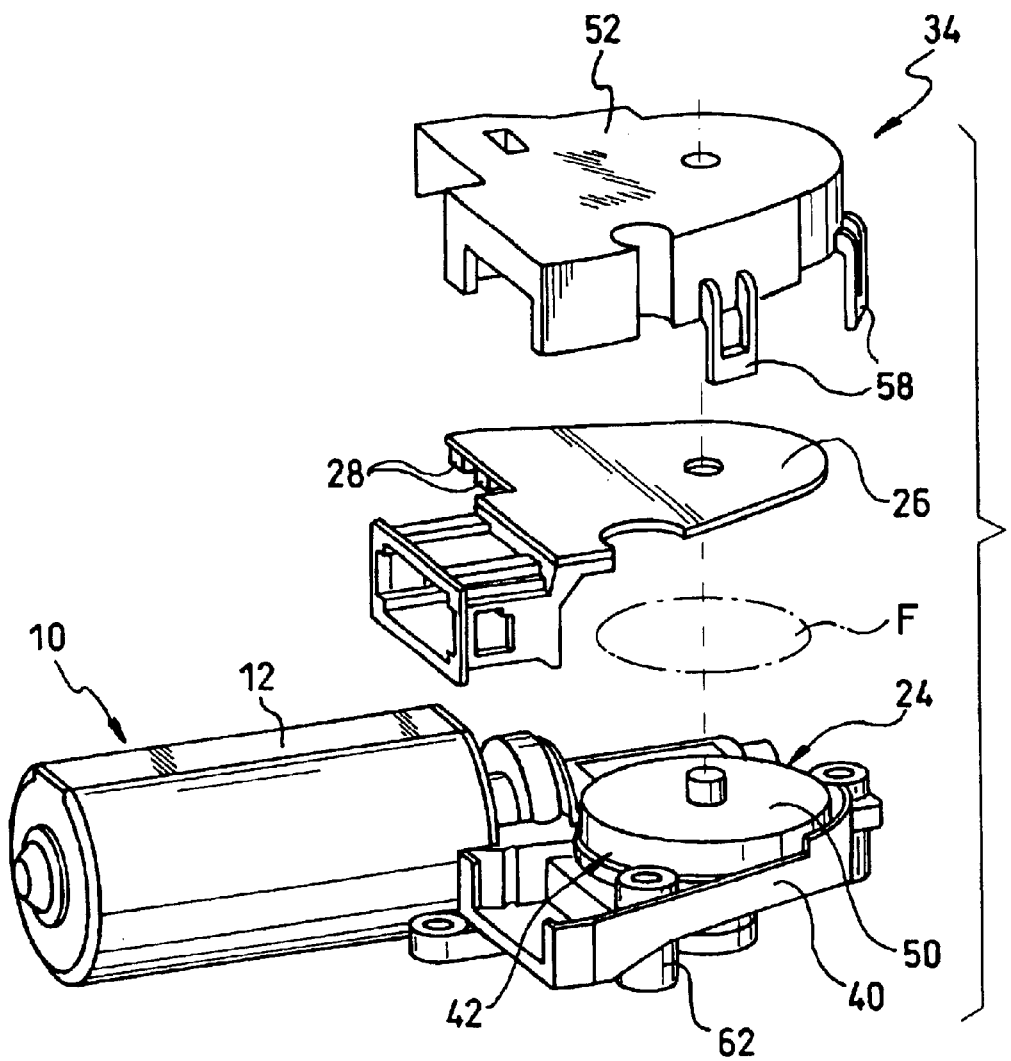

To ensure effective heat dissipation from the circuit components to be cooled to the cover 50, the pertinent circuit components make contact with the cover 50 by means of cooling lugs 67 assigned to the circuit as shown in FIG. 2. Heat transfer contact can also be established by the use of thermally conductive foils as shown in FIG. 5, or as shown in FIG. 1, by means of a thermally conductive, but electrically insulating foam or fiber body 36 located between the circuit and the housing wall.

Using the cooling action of the cover 50, the circuit for triggering the electrical motor can be accommodated in a plastic housing, which has heat dissipation which would be too low without this additional cooling, in order to ensure undisrupted operation of the drive device, even if the drive device is actuated over an interval which exceeds the conventional amount, for example, is repeatedly reversed (for example, when used for driving the cover of an openable motor vehicle roof, the cover is repeatedly opened and closed at short time intervals) without sufficiently long cooling pauses between the individual trigger phases.

Moreover, the division of the electronics housing 34 as suggested here into several closed housing sections yields an extremely compact configuration of the drive device in which all the components necessary to move the device which is to be driven are housed, and in which however the individual assemblies are located spatially separate from one another, and especially the mechanical part of the drive device which encompasses the pole shaft and the gearing is separated from the electrical part of the drive device which encompasses the electronic circuit, forming a seal, so that lubricant from the mechanical part cannot reach the electrical part; this could lead to temporary or even permanent impairment of the operation of electrical or electronic components.

Figure 3:
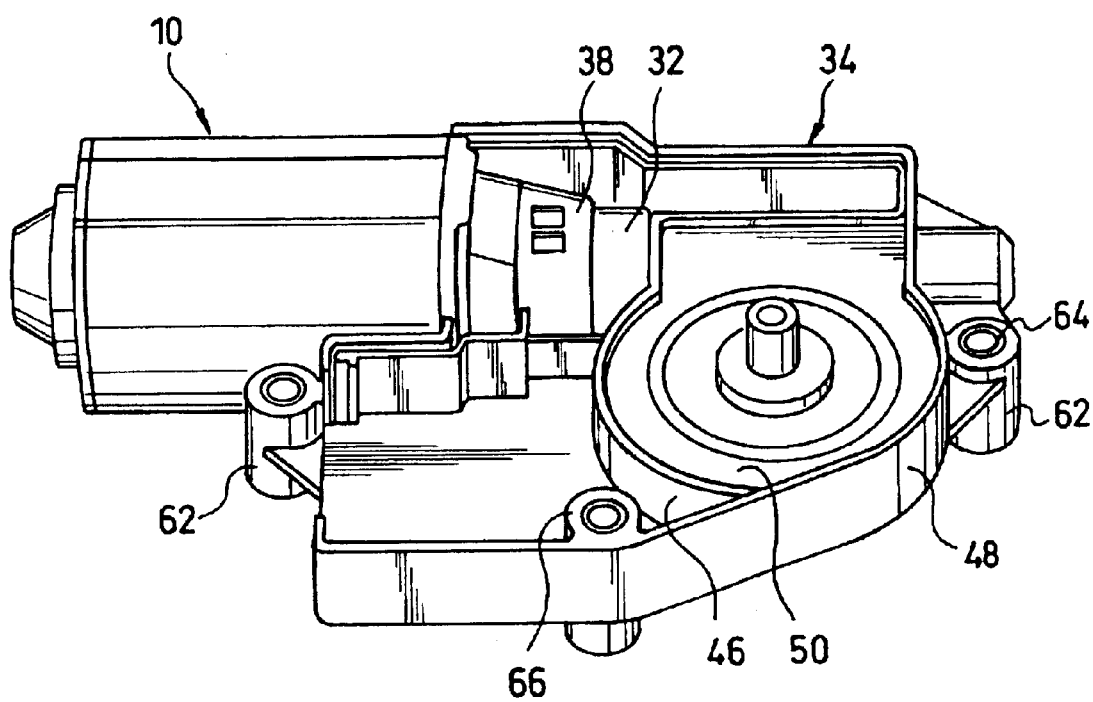
FIG. 3 is a schematic perspective of the lower part of the drive device which is shown in FIG. 1.
Figure 4:
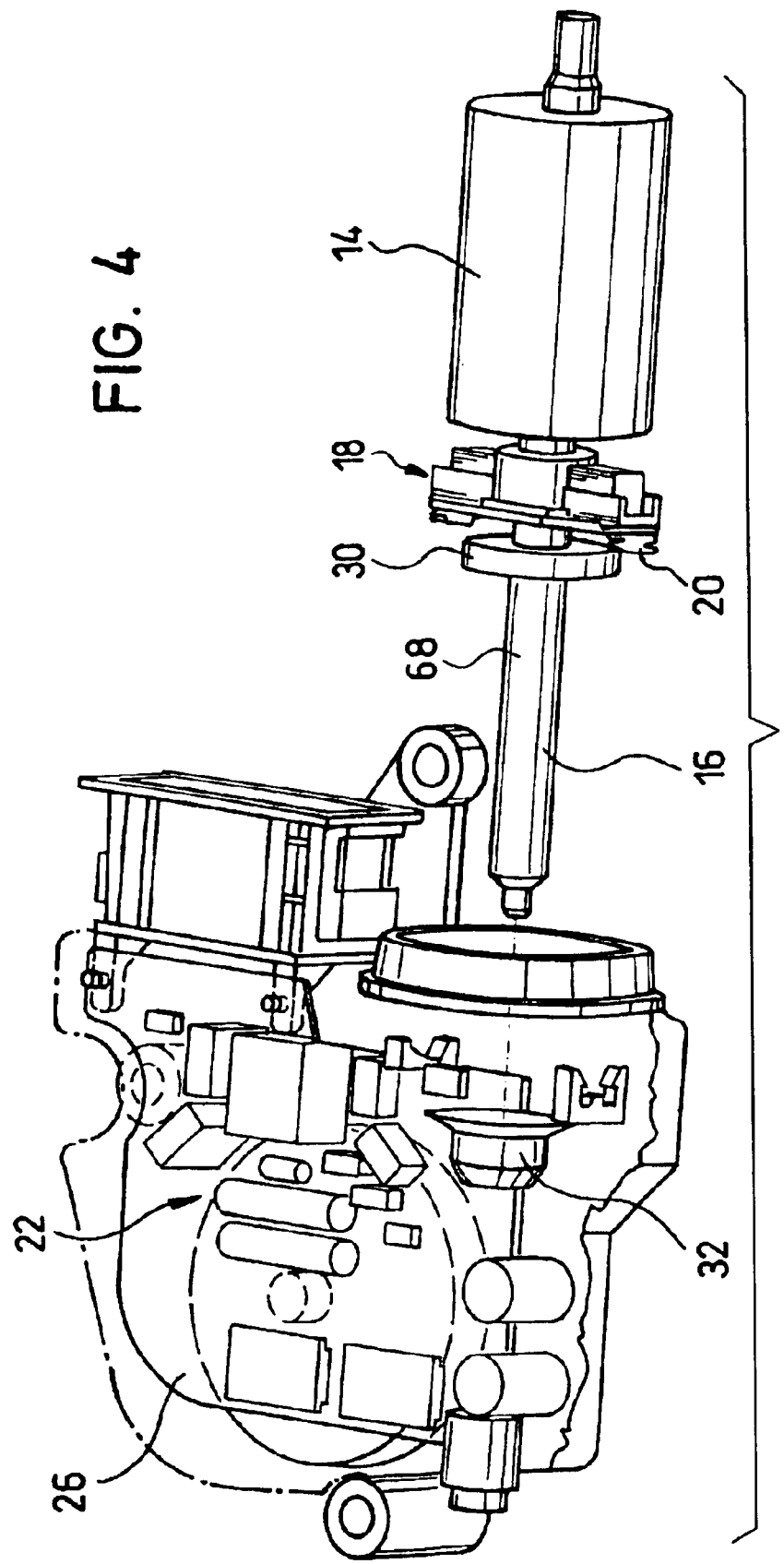
FIG. 4 is a schematic perspective of the drive device of FIGS. 1 to 3, in which the drive motor together with the pole shaft has been pulled out of the shaft housing.

To facilitate installation of the drive device, the cover 52 of the electronics housing 34 is preferably made such that the board 26 is inserted into the cover and can be locked there. For this purpose, as is shown in FIG. 2, the board 26 can have, for example, openings 54 through which the catch projections 56 which are provided on the cover 52 extend when the board 26 is inserted into the cover and which lock the board in the cover. To attach the cover 52 to the lower part 40 of the housing there are likewise preferably catch connectors. For example, as shown in FIGS. 1 & 2, there can be clip elements 58 which lock into the corresponding catch projections 60 which are made on the bottom part 40 when the cover 52 is seated on the lower part 40. To attach the drive device, for example, in a motor vehicle, on the electronics housing 34 there are penetrations 62 through which fasteners (not shown), for example, screws, can be inserted in order to attach the drive device stationary. As can be seen in FIG. 3, in the penetrations 62 there are metallic reinforcing sleeves 64 with a length which is matched to the length of the penetrations in order to prevent compressive stress of the material which forms the penetrations when the mounting screws are tightened. The penetrations 62 are all located along the outside periphery of the electronics housing 34 and are integrated into the side edge 38. In order to further increase the strength of the housing and especially of the fastening points of the housing, at least one of the penetrations 62 can be located within the outside contour of the electronics housing, as is indicated at 66 in FIG. 3.

As follows from the description above, the drive device proposed here represents an extremely compact, closed device. With the aid of the measures explained here, the electronics housing in which preferably the shaft housing and the gear casing are at least partially integrated can be made of plastic so that not only the space required for housing the drive device, but also the total weight of the drive device can be reduced without adversely affecting the operating reliability of the device.

What is claimed is:

1. Drive device for a sunroof of a motor vehicle, comprising:

an electric motor, a gearing which is in driven connection with the electric motor, a circuit for triggering the electric motor, and a gear casing for accommodating the gearing;

wherein the gear casing has at least one casing wall of a metallic material with a high thermal conductivity relative to plastic and wherein at least part of the circuit is located adjacent to said at least one casing wall outside of the gear casing with the components of the circuit being in heat exchange contact with said at least one casing wall to dissipate the heat which forms during operation of the circuit to the casing wall.

2. Drive device as claimed in claim 1, wherein a thermally conductive foil is provided to establish said heat exchange contact between the components of the circuit and the at least one casing wall.

3. Drive device as claimed in claim 1, wherein one of a thermally conductive foam and fiber body is provided to establish said heat exchange contact between the components of the circuit and the at least one casing wall.

4. Drive device as claimed in claim 1, wherein the circuit has cooling lugs to dissipate heat to the casing wall.

5. Drive device as claimed in claim 1, wherein the circuit is accommodated in an electronics housing which is also part of the gear casing.

6. Drive device as claimed in claim 5, wherein the electronics housing has a lower part and an outer cover, the lower part being part of the gear casing.

7. Drive device as claimed in claim 6, wherein the cover has means for locking the circuit thereto.

8. Drive device as claimed in claim 6, wherein the gear casing is formed by a wall surface of the electronics housing, a side wall which is joined in one piece to the wall surface and an inner cover which is seated on the side wall.

9. Drive device as claimed in claim 8, wherein the cover seals the gear casing closed.

10. Drive device as claimed in claim 8, wherein the wall with high thermal conductivity is formed by the cover.

11. Drive device as claimed in claim 5, wherein the electronics housing is made of plastic.

12. Drive device as claimed in claim 1, wherein the gearing is a worm gear pair with a worm wheel, and wherein the circuit extends at least partially over the worm wheel.

13. Drive device as claimed in claim 12, where in the circuit extends essentially completely over the worm wheel.

14. Drive device as claimed in claim 1, wherein the electric motor has a pole shaft which is located in a shaft housing and which is drive-connected to the gearing.

15. Drive device as claimed in claim 14, wherein the circuit is accommodated in an electronics housing which is also part of the gear casing; and wherein the shaft housing is integrated at least partially into the electronics housing.

16. Drive device as claimed in claim 15, wherein the electronics housing has a lower part and a cover, the lower part being part of the gear casing; and wherein the shaft housing is integrated at least partially into the lower part of the electronics housing.

17. Drive device as claimed in claim 14, wherein the shaft housing is formed by a wall surface of the electronics housing, a side wall which is joined in one piece to the wall surface and a cover which is seated on the side wall.

18. Drive device as claimed in claim 14, wherein a single cover forms a cover of the shaft housing and a cover of the gear casing.

* * * * *